(12) United States Patent
Gard et al.

(10) Patent No.: US 7,823,131 B2
(45) Date of Patent: Oct. 26, 2010

(54) DEBUGGER FOR A HARDWARE-IMPLEMENTED OPERATING SYSTEM

(75) Inventors: James J. Gard, San Jose, CA (US);
Mark W. Jensen, San Jose, CA (US);
Stephen Olsen, Fremont, CA (US);
Mark Saunders, San Jose, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 672 days.

(21) Appl. No.: 09/895,364

(22) Filed: Jun. 29, 2001

(65) Prior Publication Data

US 2003/0005417 A1    Jan. 2, 2003

(51) Int. Cl.
G06F 9/44 (2006.01)
G06F 11/00 (2006.01)
(52) U.S. Cl. .................. 717/125; 712/227; 714/30
(58) Field of Classification Search ......... 717/124–135; 714/25, 27, 31, 32, 34, 35
See application file for complete search history.

(56) References Cited

U.S. PATENT DOCUMENTS

| 4,439,865 | A | * | 3/1984 | Kikuchi et al. | 377/8 |
| 4,964,040 | A | | 10/1990 | Wilcox | |
| 5,329,471 | A | * | 7/1994 | Swoboda et al. | 703/23 |
| 5,450,586 | A | * | 9/1995 | Kuzara et al. | 717/124 |
| 5,465,335 | A | * | 11/1995 | Anderson | 718/107 |
| 5,805,892 | A | * | 9/1998 | Nakajima | 717/131 |
| 5,889,981 | A | * | 3/1999 | Betker et al. | 712/227 |
| 6,324,684 | B1 | * | 11/2001 | Matt et al. | 717/124 |
| 6,477,636 | B1 | * | 11/2002 | Osterholzer | 712/41 |
| 6,560,722 | B1 | * | 5/2003 | Frankel et al. | 714/38 |
| 6,708,290 | B2 | * | 3/2004 | Swoboda et al. | 714/30 |
| 6,754,888 | B1 | * | 6/2004 | Dryfoos et al. | 717/127 |
| 6,986,127 | B1 | * | 1/2006 | Newlin et al. | 717/135 |

OTHER PUBLICATIONS

Larry Mittag, "Software Debug Options on ASIC Cores", Jan. 1997, Embedded Systems Programming, vol. 10 No. 1.*
Adomat et al., "Real-Time Kernel in Hardware RTU: A step towards deterministic and high performance real-time systems", Jun. 1996, 8th Euromicro Workshop on Real-Time Systems, pp. 164-168.*

(Continued)

*Primary Examiner*—James Rutten
(74) *Attorney, Agent, or Firm*—Klarquist Sparkman, LLP

(57) ABSTRACT

In one embodiment, a debugger for a hardware-implemented operating system that supports one or more processors includes a host debug and a user interface. The host debug is operable to connect to a kernel processing unit of the hardware-implemented operating system via a test interface such as a Joint Test Access Group (JTAG) interface, to request information concerning internal objects of the kernel processing unit during the operation of the processors, and to receive the requested information without disturbing the operation of the processors. The user interface is then used to present the requested information to the user. In one embodiment, the debugger further includes a target resident debug server that is scheduled by the kernel processing unit to execute debugging commands issued by the host debug (e.g., a command to collect information resident in the processor's data space, a command to set a breakpoint, a command to respond to a breakpoint, etc.). The target resident debug server executes the debugging commands without unreasonable interference with the operation of the processors.

25 Claims, 6 Drawing Sheets

OTHER PUBLICATIONS

Iga et al., "Real-time software development system RTIPLUS", Dec. 1995, 12th TRON Project International Symposium, pp. 24-33.*

El Shobaki and Lindh, "A hardware and software monitor for high-level system-on-chip verification", Mar. 2001, 2001 International Symposium on Quality Electronic Design, pp. 56-61.*

Sieh, V., "Fault Injector using UNIX ptrace Interface", Nov. 1993, Friedrich-Alexander University, CS Dept. Internal Report, IMMD III, Accessed online Jun. 24, 2004 at <http://www3.informatik.uni-erlangen.de/Publications/Reports/ir$_{13}$ 11$_{13}$ 93.pdf>.*

"BSD Manpages: ptrace", Archived 1999 <http://web.archive.org/web/19991104204211/http://www.neosoft.com/neosoft/man/ptrace.2.html>.*

John Catsoulis, "Designing Embedded Hardware", Nov. 2002, O'Reilly, ISBN: 0-596-00362-5, Section 8.3.*

J. Lee, V. Mooney, A. Daleby, K. Ingstrom, T. Klevin and L. Lindh, "A Comparison of the RTU Hardware RTOS with a Hardware/Software RTOS," Proceedings of the Asia and South Pacific Design Automation Conference (ASPDAC'03), pp. 683-688, Jan. 2003.*

Silberschatz and Galvin, "Operating System Concepts", Dec. 1997, Addison-Wesley, 5th Edition, ISBN 0-201-59113-8, Chapters 4 and 5, pp. 89-153.*

Silberschatz and Galvin, "Operating System Concepts", Dec. 1997, Addison-Wesley, 5th Edition, ISBN 0-201-59113-8, Chapter 2.*

Rosenberg, "How Debuggers Work", 1996, Wiley Computer Publishing, Chapters 1, 4, and 8.*

Lindh et al., "Hardware Accelerator for Single and Multiprocessor Real-Time Operating Systems", Jun. 1998, Seventh Swedish Workshop on Computer Systems Architecture, Chalmers, Göteborg, Sweden.*

Kohout et al., "Hardware Support for Real-time Operating Systems" Oct. 3, 2003, ACM, Codes+ISSS '03, pp. 45-51.*

Walls, Colin, et al., "Multicore Debug Sought in SoC Design," Techsearch EETimes, Mar. 27, 2000, Issue: 1106, 4 pages, available: http://www.techweb.com/se/directlink.cgi?EET20000327S0085.

* cited by examiner

DEBUGGER FOR A HARDWARE-IMPLEMENTED OPERATING SYSTEM

FIELD OF THE INVENTION

The present invention relates to operating systems and more specifically to debugging a hardware-implemented operating system.

BACKGROUND OF THE INVENTION

Debugging tools for software-implemented real time operating systems are well known in the art. One existing debugging tool includes a host debug and a target debug (also referred to as a monitor) that communicate to each other via a network bridge (e.g., a serial bridge, an Ethernet bridge, a shared memory bridge, etc.). In particular, the target debugger receives debugging commands from the host debugger, obtains data requested by the host debugger and sends this data back to the host debugger. The data requested by the host debugger may include status information about a currently running process, information about processes awaiting their turn in a queue, a snapshot of the operating system at the time the command was executed, or any other related information. Typically, in order to extract the requested information, the current operation of the processor has to be stopped. In addition to such intrusiveness, this debugging technique is cumbersome to use because it requires the existence of a network bridge and a target debugging application written for a specific operating system.

Another known debugging technique uses IEEE 1149.1 interface (also known as Joint Test Access Group (JTAG) interface) to enable a host debugger application to interact with a processor and a software-implemented operating system. JTAG is a standard specifying how to control and monitor pins of compliant devices on a printed circuit board. JTAG allows the vendors of debugging tools to provide such testing functionality as external access to memory and registers of the processor, connected to a JTAG port, and the ability to stop and start the code execution. Using JTAG, the host debugger application is provided with information on various components of the computer system (e.g., processor registers, an address bus, a data bus, memory caches, etc.) with no need to have a target-resident debugger application or a network bridge. However, current JTAG-based debugging tools cannot extract the information requested by the host debugger application without interrupting the operation of the processor. In addition, existing JTAG-based debugging techniques do not support hardware-implemented real time operating systems.

Therefore, what is required is a tool to debug a hardware-implemented operating system without disturbing the operation of a processor.

SUMMARY OF THE INVENTION

In one embodiment, a debugger for a hardware-implemented operating system that supports one or more processors includes a host debugger and a user interface. The host debugger is operable to connect to a kernel processing unit of the hardware-implemented operating system via a test interface such as a Joint Test Access Group (JTAG) interface, to request information concerning internal objects of the kernel processing unit during the operation of the processors, and to receive the requested information without disturbing the operation of the processors. The user interface is then used to present the requested information to the user. In one embodiment, the debugger further includes a target resident debug server that is scheduled by the kernel processing unit to execute debugging commands issued by the host debugger (e.g., a command to collect information resident in the processor's data space, a command to set a breakpoint, a command to respond to a breakpoint, etc.). The target resident debug server executes the debugging commands without unreasonable interference with the operation of the processors.

Other features of the present invention will be apparent from the accompanying drawings and from the detailed description which follows.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Figure 1:
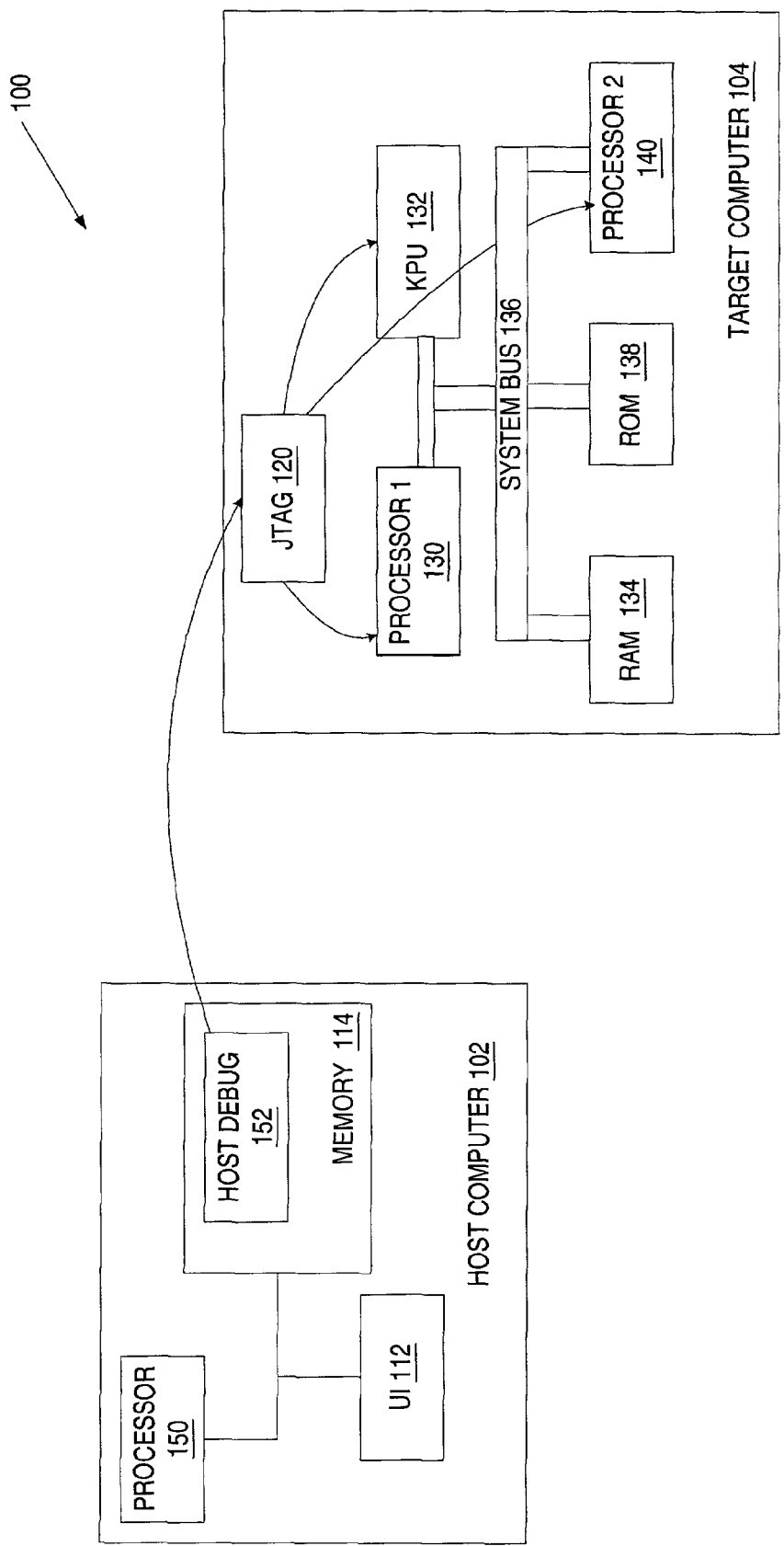
FIG. 1 is a block diagram of a system in which the present invention may operate.

A method and system for debugging a hardware-implemented operating system are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of a system 100 in which a debugger of the present invention may operate. System 100 includes a host computer 102 and a target computer 104. The host computer 102 and the target computer 104 can be any type of computing devices such as, for example, desktop computers, workstations, laptops, mainframe computers, etc.

The target computer 104 is comprised of a system bus or other communications means 136 for communicating information and processors 130 and 140 coupled with bus 136 for processing information. Each of the processors 130 and 140 may be any type of processing means such as a microprocessor, digital signal processor, microcontroller, or the like. The target computer 104 further comprises a random access memory (RAM) or other dynamic storage device 134 (commonly referred to as main memory), coupled to system bus 136, for storing information and instructions to be executed by processors 130 and 140, including instructions for performing the execution of the various method embodiments of the present invention such as methods 400 and 600 described below in conjunction with FIGS. 4 and 6. Main memory 134 also may be used for storing temporary variables or other intermediate information during execution of instructions by processors 130 and 140. The target computer 104 also comprises a read only memory (ROM) and/or other static storage device 138, coupled to system bus 136, for storing static information and instructions for processors 130 and 140. Further, the target computer 104 comprises a kernel processing unit (KPU) 132 coupled to the system bus 136 for supporting processors 130 and 140. The KPU 132 is a core portion of an operating system (OS) that is implemented in hardware. The hardware-implemented OS also includes a set of software elements that is contained in memory 134. The hardware-implemented OS may be a real time operating system (RTOS) or a non-real time operating system. One embodiment of a hardware-implemented OS will be described in greater detail below in conjunction with FIGS. 2 and 3.

The target computer 104 may be coupled to various optional devices not shown on FIG. 1, e.g., a data storage device such as a magnetic disk or optical disk and its corresponding drive for storing information and instructions, a display device for displaying information to a computer user, an alphanumeric input device for communicating information and/or command selections to processors 130 and 140, a communication device for accessing remote computers or servers, etc.

The host computer 102 comprises a processor 150 and memory 114. Processor 150 can be any type of processor capable of executing software, such as a microprocessor, digital signal processor, microcontroller, or the like. Memory 114 can be a hard disk, a floppy disk, random access memory (RAM), read only memory (ROM), flash memory, or any other type of machine medium readable by processor 150. Memory 114 can store instructions for performing the execution of the various method embodiments of the present invention such as methods 400 and 600 described below in conjunction with FIGS. 4 and 6. In addition, the host computer 102 may include various other components including any of the components described above in conjunction with the target computer 104.

In one embodiment, the host computer 102 comprises a host debug 152 and a user interface 112. The host debug 152 can communicate with the KPU 132 and/or processors 130 and 140 via a JTAG interface 120. In one embodiment, a single JTAG interface 120 connects to processors 130 and 140 and the KPU 132 to enable the host debug 152 to interact with processors 130 and 140 and the KPU 132. Alternatively, two separate JTAG interfaces 120 are used to connect the host debug 152 to the processor 130 or 140 and to the KPU 132. In either embodiment, the host debug 152 is able to identify the processing units connected to one or more JTAG interfaces and select a particular processing unit for debugging.

In one embodiment, the host debug 152 connects to the KPU 132 via the JTAG interface 120, requests information concerning one or more internal elements of the KPU 132 during the operation of processors 130 and 140 and receives the requested information from the KPU 132 without disturbing the operation of the processors 130 and 140. The user interface 112 is then used to present the requested information to the user.

In one embodiment, the requested information includes the state of each internal object of the KPU 132. The internal objects of the KPU 132 may include mail boxes, queues, virtual timers, event flag groups, task control blocks, and/or various other components and internal data structures. For example, if the host debug 152 issues a command requiring to take a snapshot of the operating system, the JTAG interface 120 scans the internal objects of the KPU 132 and obtains the status of every internal object. Because the kernel's objects are built in hardware, the JTAG interface 120 can extract the above information without interrupting the operation of the processors 130 and 140, unlike the prior art JTAG-based debugging tools which could not obtain the debugging information without stopping the machine, i.e., the processor would have to stop a currently running task in order to execute a system call requesting to extract information concerning the elements of the software-implemented operating system.

In one embodiment, the snapshot data is placed in a set of registers that is contained in the KPU 132. A task is then placed in a queue to transfer this snapshot data to the host debug 152. A set of exemplary registers of the KPU 132 that store data concerning the KPU's internal objects will be described in more detail below in conjunction with FIG. 5.

In one embodiment, the debugger of the present invention also includes a target-resident debug server which communicates with the host debug 152 via the JTAG interface. In one embodiment, the target resident debug server is scheduled by the KPU 132 to perform debugging commands issued by the host debug 152. For instance, the host debug 152 may send a command requesting to set a breakpoint for a certain task. The debug server will then be scheduled to run to execute this command, thereby allowing the setting of a breakpoint without stopping the machine, i.e., enabling a "runmode" debug. Subsequently, when the breakpoint is encountered, the debug server may notify the host debug 152 and may execute any other commands issued by the host debug 152. For example, the debug server may collect information resident in the data space of processor 130 or 140. Such information may concern the context of a specific thread, register set of a specific thread, or any other relevant information.

In one embodiment, the host debug 152 needs information about an RTOS object that is not located in the KPU 132, i.e., a software-implemented component of the operating system. The KPU 132 does not contain the requested information itself but it is aware where in memory the requested information is located. In this embodiment, two JTAG interfaces are used to access the requested information: the KPU's JTAG interface is used to find out where in memory the requested information is located, and the CPU's JTAG interface is used to retrieve the requested information from this memory location. One embodiment of a method for debugging objects located outside of the KPU will be described in more detail below in conjunction with FIG. 6.

Figure 2:
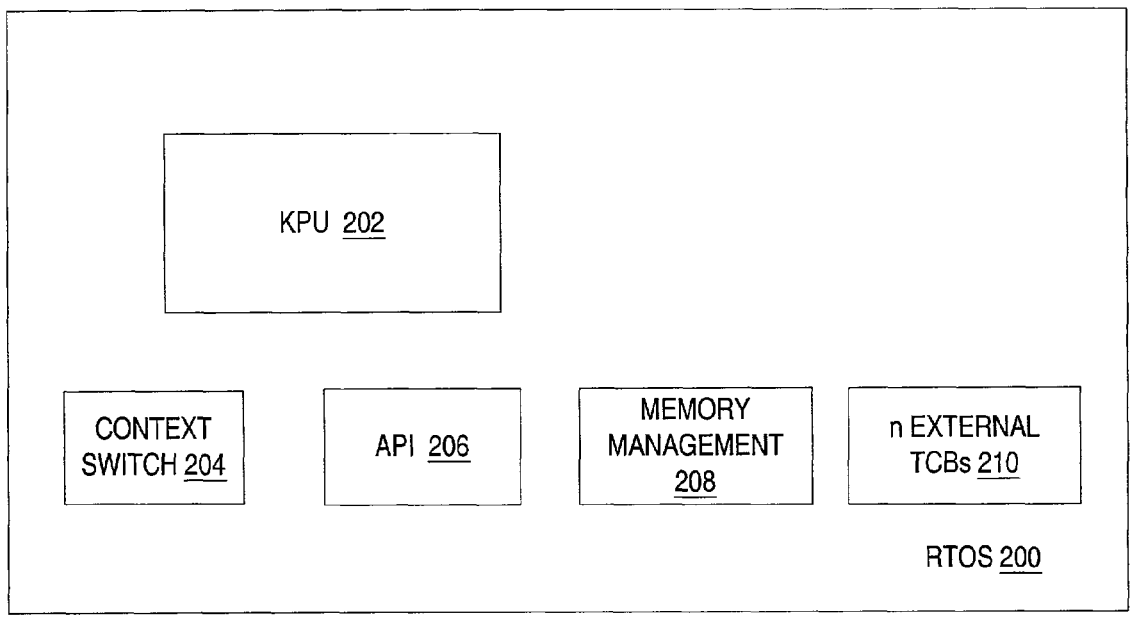
FIG. 2 is a block diagram of an exemplary hardware-implemented operating system.

FIG. 2 is a block diagram of an exemplary hardware-implemented RTOS 200. RTOS 200 includes a KPU 202 which represents a hardware-implemented core portion of RTOS 200 and a set of software-implemented components 204-210. The implementation of kernel objects in hardware addresses several performance problems suffered by a conventional software-implemented RTOS. Some advantages of a hardware-implemented RTOS over a software-implemented RTOS include improved performance of system calls, reduced latency during task rescheduling, elimination of timer intrusion, simplified board support packages, reduced size of a kernel footprint, etc.

KPU 202 will now be briefly described with reference to FIG. 3. As shown on FIG. 3, a central component of KPU 202 is a task manager 310 that is responsible for scheduling and managing of multiple tasks in the system. A task is an independent sequential flow of control. In a real time system, tasks execute in an asynchronous fashion and in real time. Several tasks can operate autonomously from the same piece of code, or tasks can be located in separate code modules. The task manager 310 is responsible for scheduling the tasks and transitioning the tasks from one state to another. The task manager 310 is coupled to a set of task control blocks (TCBs). Each TCB maintains a set of pointers to a stack containing status information for a corresponding active task that is not in control of the processor. The tasks are scheduled based on each task's identification number, a priority level assigned to each task during configuration, and the order in which tasks are made ready among equal-priority tasks. The tasks may transition between several states. These states include an executing state, a ready for execution state and a suspended state. The suspended state may be further divided into three categories: suspended, pending and delayed. Tasks move from state to state when certain events occur. These events may be triggered by a system call, a command or a time-out.

KPU 202 also includes several intertask communication and synchronization mechanisms: a set of mailboxes 308, a set of event flags 306 and a set of queues 304. These mechanisms allow a task to exchange data with other tasks and synchronize with other tasks. The above mechanisms also enable tasks to mutually exclude each other so that each task is guaranteed exclusive control of a protected resource. Specifically, a task can post a message to a mailbox 308 to exchange data with another task or to synchronize with another task. In addition, mailboxes 308 may be used to perform mutual exclusion of a protected resource. For instance, a task may lock the resource by initializing a mailbox 308 to any key value. Any task that needs to use that resource pends at the mailbox 308 for the key. As each task finishes with the resource, it posts the key back to the mailbox to enable the next task.

Queues 304 may be used by tasks to pass messages and to mutually exclude resources of the same type. Event flags 306 may be used by tasks to signal the occurrence of events to other tasks. Mailboxes 308, queues 304 and event flags 306 pass the data they store to the task manager 310 to enable proper scheduling and task transitions between the states.

Command logic 312 receives various commands (e.g., commands requesting to post data to mailboxes 308, queues 304 and event flags 306) and passes associated instructions and data to various objects of the KPU 202 using an internal address bus 318 and an internal data bus 320. Virtual timers 302 generate time ticks and pass the time ticks to the task manager 310 for task scheduling. Clock logic 316 provides a real-time clock for all objects of RTOS 200.

Figure 3:
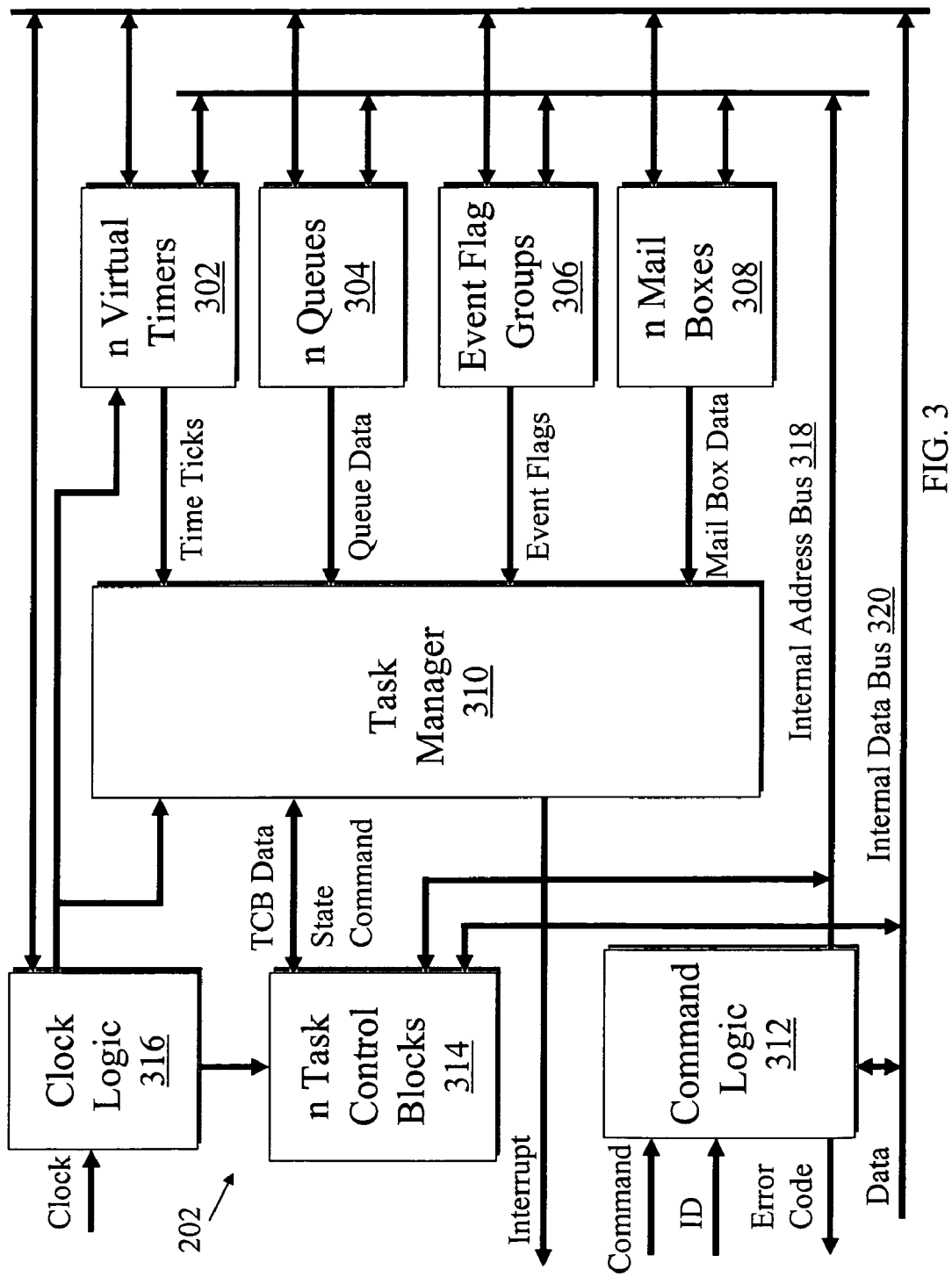
FIG. 3 is a block diagram of an exemplary kernel processing unit.

It should be noted that other components of RTOS 200 may be a part of the KPU 202, or alternatively, some of the components shown in FIG. 3 may be implemented in software and as such will not be included in the KPU 202.

Returning to FIG. 2, exemplary software components of RTOS 200 include a context switch 204, an application program interface (API) 206, a memory management module 208, and external TCBs 210. Context switch 204 includes information on the sequence of events that takes place when control of the processor is transferred from the running task to another ready task. Memory management module 208 is responsible for allocating memory to tasks and interrupt service requests. External TCBs 210 are associated with internal TCBs 314 and contain context specific information such as stack location information, stack size, information concerning a pointer to the saved register context, and any task global information. Although FIG. 2 shows four software-implemented operating system components, more or less of such components may be contained in RTOS 200 with a hardware implemented task manager. It should be further noted that RTOS 200 represents only an example of a hardware-implemented operating system and should not be interpreted to limit the scope of the present invention. Instead, the debugging technique of the present invention can be used for any known in the art operating system that is partially or entirely implemented in hardware.

Figure 4:
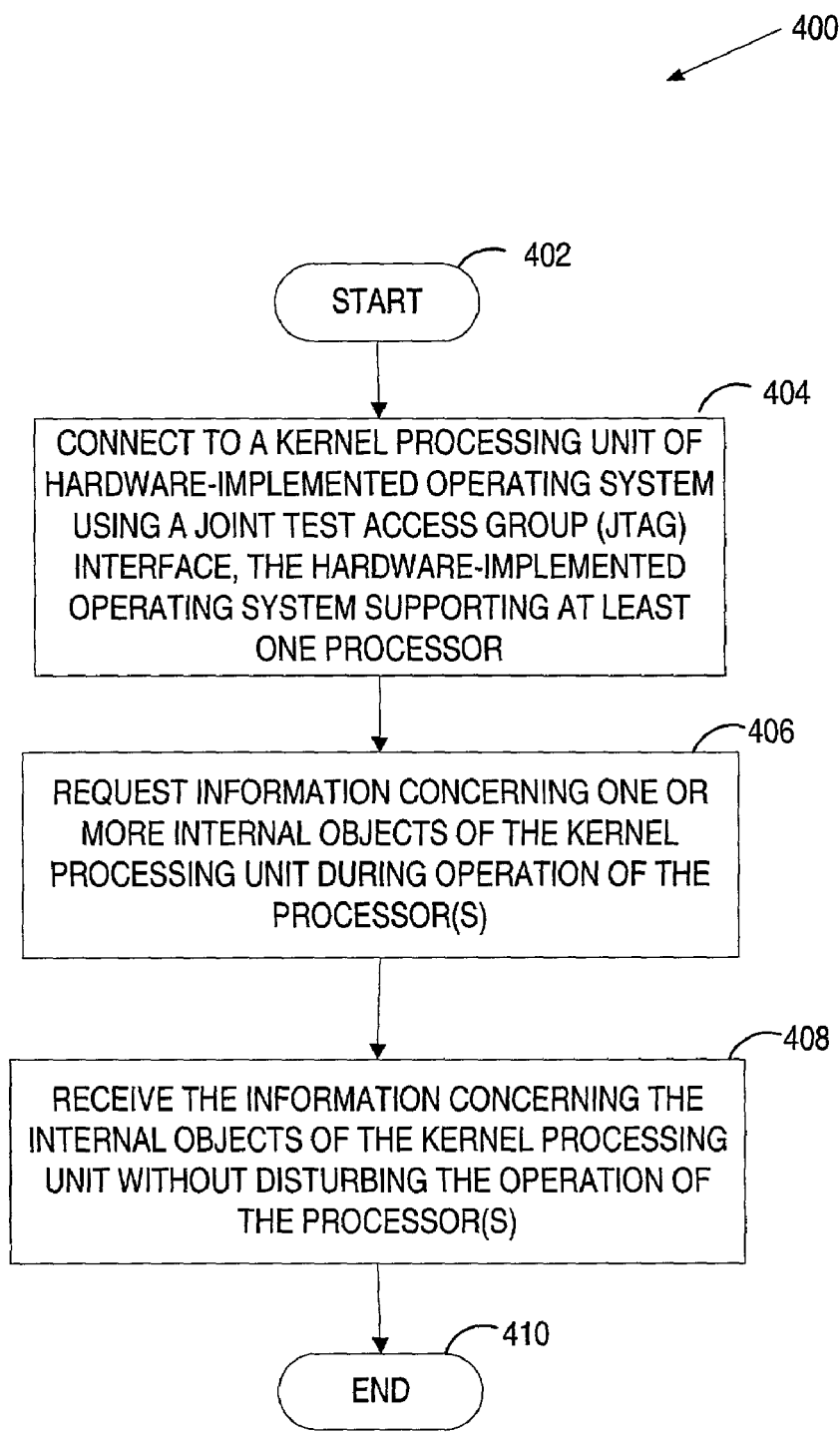
FIG. 4 is a flow diagram of a method for debugging a hardware-implemented operating system, according to one embodiment of the present invention.

FIG. 4 is a flow diagram of a method 400 for debugging a hardware-implemented operating system, according to one embodiment of the present invention. Method 400 begins with connecting a host debug to a KPU using a test interface such as a JTAG interface (processing block 404). As described above, a KPU represents a hardware-implemented core portion of an operating system. The operating system may be a real time operating system or non-real time operating system. In one embodiment, the host computer identifies two or more processing units (i.e., one or more processors and the KPU) and selects the KPU from these processing units for debugging.

Next, at processing block 406, information concerning one or more elements of the KPU is requested during the operation of the processor(s). In one embodiment, these objects include mail boxes, event flag groups, queues, task control blocks and other internal objects of the KPU. The requested information may include a state of each of these objects, data stored in any of these objects, or any other similar information. Further, at processing block 408, the requested information is received by the host debug without disturbing the operation of the processor(s).

In one embodiment, a debug server may run on the target computer as one of multiple tasks managed by the KPU. In particular, when the host debug issues a command, a debug server is scheduled to run on the target computer to execute the command. For example, the debug server may be scheduled to execute a command of the host debug to set a breakpoint for one or more tasks or to respond to a breakpoint that was set previously. In another example, the debug server may be scheduled by the KPU to collect information resident in the CPU's data space, e.g., information concerning the context of a specific thread or the register set of a specific thread. Accordingly, the debugging is performed in a non-intrusive manner, without stopping the operation of the processor. In one embodiment, the KPU contains a debug interface associated with each processor supported by the KPU. The debug interface includes a set of registers for storing data obtained by the debug server when executing the commands issued by the host debug.

Figure 5:
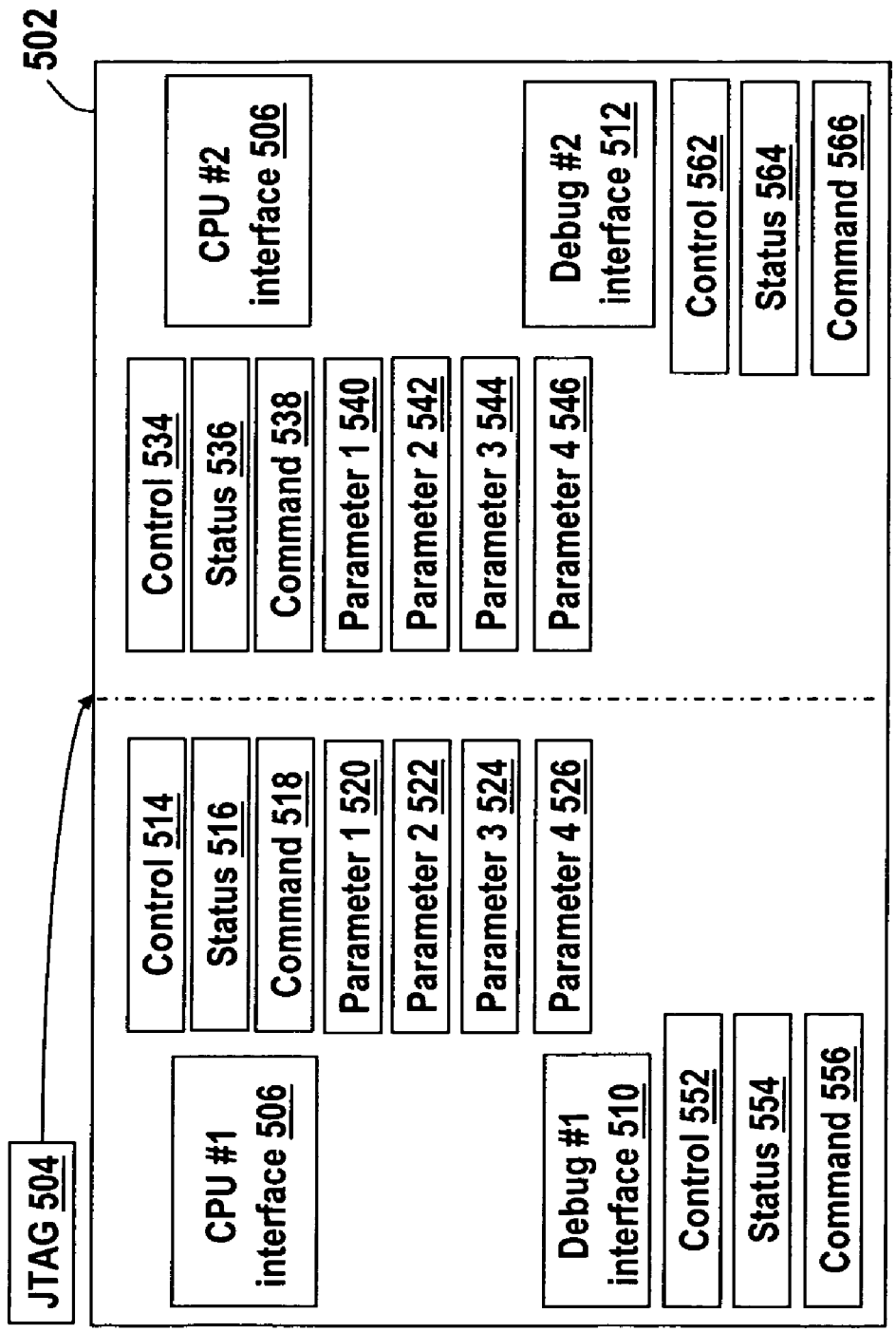
FIG. 5 illustrates exemplary registers of a kernel processing unit.

FIG. 5 illustrates a set of exemplary registers of a KPU 502, according to one embodiment of the present invention. The KPU 502 includes a processor interface 506 for a first processor supported by the KPU 502 and a processor interface 508 for a second processor supported by the KPU 502. A JTAG interface 504 (e.g., a JTAG port) is connected to the KPU 502 and is used to access processor interfaces 506 and 508. Each processor interface contains a set of registers 514-526 or 534-546 to store information concerning the elements of the KPU 502. For instance, if a currently running task executes a command to post a message to a mail box, the set of registers 514-526 will store the information pertaining to this task. That is, a status register 516 will store a status of the KPU 502. For instance, the status may indicate that the KPU 502 is ready to receive a new command or that the data requested previously is now available. A command register 518 will store the content of the post command or an identifier of this command, a parameter register 520 will store an identifier of the mail box to which the message is required to be posted, and a parameter register 520 will store the content of the message that is required to be posted to the mail box. Control registers 514 and 534 are used to control the operation of the KPU 502. In one embodiment, control registers 514 and 534 issue specific attributes of the KPU 502 that are used by the system to set up the KPU 502.

When the host debug requests information concerning any specific state in the KPU 502 (e.g., information identifying a currently running task), this information is extracted from the KPU's internal structures and then passed to the host debug via the JTAG 504, without stopping the operation of the processor. In addition, the host debug may request information on a state change inside the KPU 502. Changes in the KPU's state may result from commands requesting to delay a task, pend on a mailbox, post to a queue, etc. In one embodiment, occurrences of such events are captured using the KPU's internal debug command and then passed to the host debug via the JTAG 504.

In one embodiment, the KPU 502 also includes debug interfaces 510 and 512 associated with corresponding processors. The debug interfaces 510 and 512 include registers 552-556 and 562-566 that are used by a debug server when it is run by a corresponding processor. For example, registers 552-556 and 562-566 may store information identifying a breakpoint that needs to be set by the debug server or a TCB that needs to be retrieved by the debug server for the host debug. Registers 552-556 and 562-566 may also store information concerning the execution of the host debug command by the debug server (e.g., the information specifying that the debug server has completed the command successfully).

As described above, the debug server resides on the target computer and is scheduled by the KPU 502 to execute debugging commands such as commands to collect information resident in the processor's data space, commands to set breakpoints, commands to respond to breakpoints, etc. In addition, the debug server may need to capture a stack trace and traverse task TCBs to find the context and the stack base. Then, using the stack information, the debug server may pass any relevant information from the stack to the KPU 502 which will send it to the host debug via JTAG 504.

In contrast to conventional JTAG-based debugging tools that cannot extract information without interrupting the operation of the processor, the debug server of the present invention runs as a task, allowing the system to service interrupt service routines (ISRs). As a result, the intrusion on the CPU that is caused by the debug server is minimal.

Figure 6:
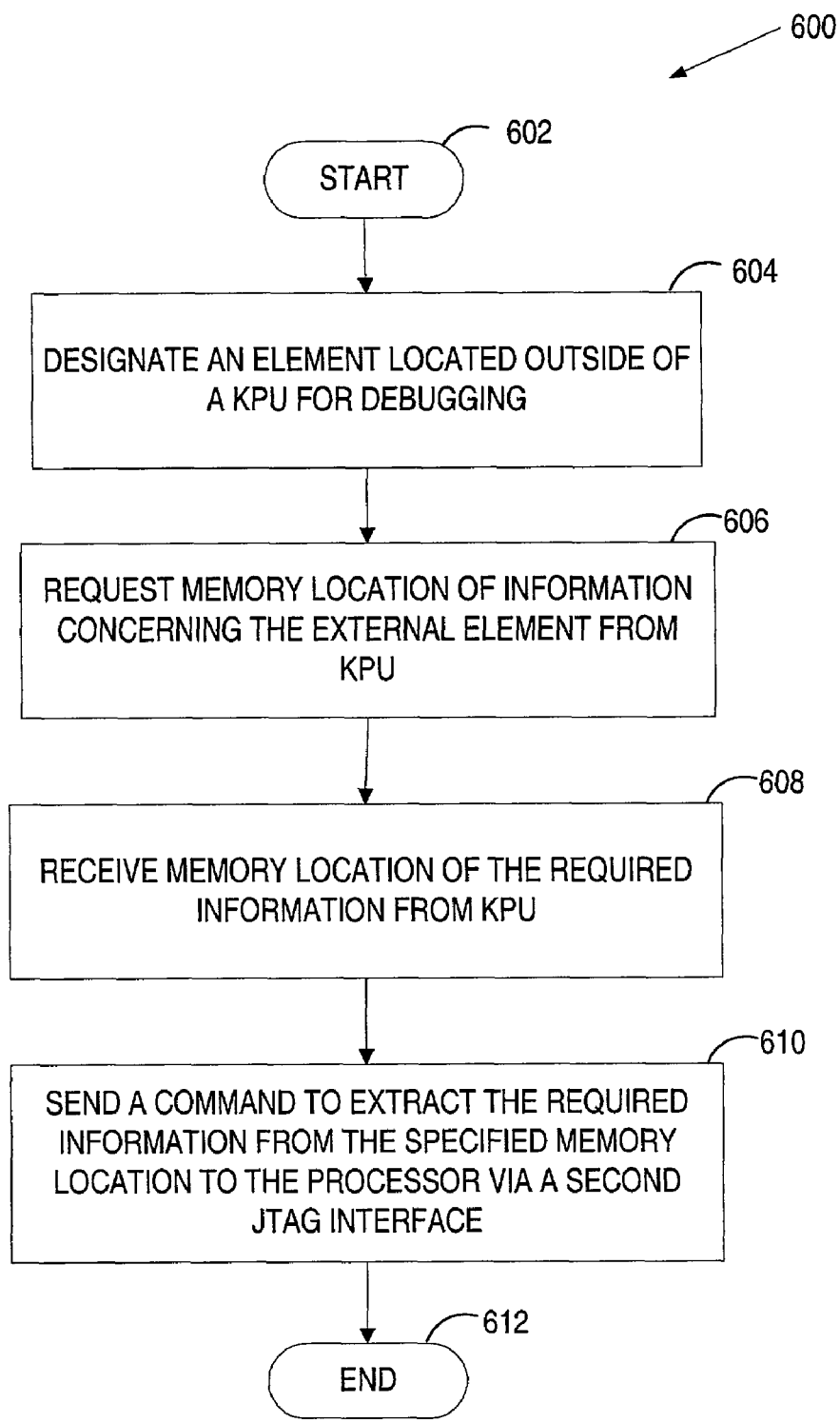
FIG. 6 is a flow diagram of a method for debugging components located outside of a kernel processing unit, according to one embodiment of the present invention.

In one embodiment, a host debug requests information concerning an element located outside of a KPU. For instance, the host debug may need information on the content of a register set for a certain task. As described above, this information is contained in one of the external TCBs of FIG. 2. Accordingly, the KPU cannot provide this information to the host debug. Instead, the host debug needs to request this information from the processor. FIG. 6 is a flow diagram of a method 600 for debugging components located outside of the KPU, according to one embodiment of the present invention. These components may include software-implemented elements of the operating system or other elements and data structures located in the main memory.

Referring to FIG. 6, method 600 begins with designating an element located outside of the KPU for debugging (processing block 604). For example, the external element may be an external TCB 210 of a particular task. At processing block 606, a request is sent to the KPU to specify where in memory the information concerning this external element is located. In the example above, the host debug may need to know the content of the register set of a specific task. Then, the request will ask for the location of this information in memory. As described above, the communication between the KPU and the host debug is enabled using a JTAG interface (e.g., a JTAG port) of the KPU.

At processing block 608, data specifying the memory location of the required information is received from the KPU. Further, at processing block 610, a command to extract the required information from the specified memory location is sent to the processor. The communication between the host debug and the processor is enabled using a JTAG interface of the processor. Accordingly, the JTAG interface of the KPU and the JTAG interface of the processor are both used for debugging an element located outside the KPU.

The above combined method of collecting information on software-implemented components of the operating system that are located in memory allows a direct transfer of data from the KPU to memory without the processor's involvement, thereby eliminating a need for a direct memory access (DMA) controller.

A method and system for debugging a hardware-implemented operating system have been described. The specific arrangements and methods described here are illustrative of the principles of this invention. Numerous modifications in form and detail may be made by those skilled in the art without departing from the true spirit and scope of the invention. Although this invention has been shown in relation to a particular embodiment, it should not be considered so limited. Rather it is limited only by the appended claims.

What is claimed is:

1. A method for debugging comprising:
    connecting to a kernel processing unit of a hardware-implemented operating system using a standardized test interface, the hardware-implemented operating system supporting at least one processor;
    requesting information concerning one or more objects of the kernel processing unit during an operation of the at least one processor;
    receiving the information concerning the one or more objects of the kernel processing unit without disturbing the operation of the at least one processor;
    designating one or more elements located outside of the kernel processing unit for debugging;
    requesting data specifying memory location of information concerning the one or more elements from the kernel processing unit; and
    sending a command to retrieve the information concerning the one or more elements from the specified memory location to the processor via a second test interface.

2. The method of claim 1 wherein the test interface is a Joint Test Access Group (JTAG) interface.

3. The method of claim 1 further comprising displaying the information concerning the one or more objects of the kernel processing unit to the user.

4. The method of claim 1 wherein the information concerning the one or more objects includes a state of each of the one or more objects.

5. The method of claim 1 further comprising: sending a debugging command to a debug server, the debug server being one of a plurality of tasks managed by the operating system; and the debug server executing the debugging command without interrupting interference with the operation of the at least one processor.

6. The method of claim 5 wherein the debugging command requires the debug server to set a breakpoint for one or more tasks.

7. The method of claim 5 wherein the debugging command requires the debug server to monitor a particular task.

8. The method of claim 5 further comprising: the debug server storing data requested by the debugging command in one or more registers of a debug interface within the kernel processing unit.

9. A system comprising:
    a target computer including at least one processor and a kernel processing unit of a hardware-implemented operating system supporting the at least one processor;
    a host computer including a host debug; and
    a test interface to connect the host debug to the kernel processing unit, the host debug is to request information concerning one or more objects of the kernel processing unit during an operation of the at least one processor and to receive the requested information without disturbing the operation of the at least one processor;
    wherein the test interface is a first test interface and further comprising a second test interface to connect the host debug to the processor wherein the host debug is to designate one or more elements located outside of the kernel processing unit for debugging, to request data specifying memory location of the information concerning the one or more elements from the kernel processing unit, and to send a command to retrieve the information concerning the one or more elements from the specified memory location to the processor via the second test interface.

10. The system of claim 9 wherein the test interface is a Joint Test Access Group (JTAG) interface.

11. The system of claim 9 wherein the host computer further comprises a display device to display the requested information to the user.

12. The system of claim 9 wherein the kernel processing unit comprises a plurality of registers to store the information concerning the one or more objects of the hardware-implemented operating system.

13. The system of claim 9 wherein the target computer further comprises a debug server to run at a scheduled time, to receive a debugging command from a host debug and to execute the debugging command without stopping the operation of the at least one processor.

14. The system of claim 13 wherein the debugging command requires the debug server to set a breakpoint for one or more tasks.

15. The system of claim 13 wherein the debugging command requires the debug server to monitor a particular task.

16. The system of claim 13 wherein the kernel processing unit further comprises one or more debug interfaces associated with the at least one processor, each of the one or more debug interfaces comprising a set of registers to store data requested in the debugging command.

17. A debugger for a hardware-implemented operating system supporting at least one processor, the debugger comprising:
    a host debug to connect to a kernel processing unit of the hardware-implemented operating system using a test interface that is based on a standard, to request information concerning one or more objects of the kernel processing unit during an operation of the at least one processor, and to receive the information concerning the one or more objects of the kernel processing unit without disturbing the operation of the at least one processor; and
    a user interface to present the information concerning the one or more objects of the kernel processing unit to the user;
    wherein the host debug is to receive data specifying memory location of information concerning one or more elements located outside of the kernel processing unit from the kernel processing unit, and to send a command to retrieve the information concerning the one or more elements from the specified memory location to the processor via a second test interface.

18. The debugger of claim 17 wherein the test interface is a Joint Test Access Group (JTAG) interface.

19. The debugger of claim 17 wherein the information concerning the one or more objects includes a state of each of the one or more objects.

20. The debugger of claim 17 further comprising: a target debug server to run at a scheduled time, to receive a debugging command from a host debug, and to execute the debugging command without interrupting the operation of the at least one processor.

21. The debugger of claim 20 wherein the debugging command requires the target debug server to set a breakpoint for one or more tasks.

22. The debugger of claim 20 wherein the debugging command requires the target debug server to monitor a particular task.

23. The debugger of claim 20 wherein the target debug server is to store data requested by the debugging command in one or more registers of a debug interface within the kernel processing unit.

24. A computer readable storage medium that provides instructions, which when executed on a processor, cause said processor to perform operations comprising:

connecting to a kernel processing unit of a hardware-implemented operating system using a test interface, the hardware-implemented operating system supporting at least one processor;

requesting information concerning one or more objects of the kernel processing unit during an operation of the at least one processor; and receiving the information concerning the one or more objects of the kernel processing unit without disturbing the operation of the at least one processor;

designating one or more elements located outside of the kernel processing unit for debugging;

requesting data specifying memory location of information concerning the one or more elements from the kernel processing unit; and sending a command to retrieve the information concerning the one or more elements from the specified memory location to the processor via a second test interface.

25. An integrated circuit having circuitry that implements a hardware-implemented operating system debugged by the method of claim 1.

* * * * *